(12) United States Patent
Suzuki et al.

(10) Patent No.: US 6,603,635 B1
(45) Date of Patent: *Aug. 5, 2003

(54) MOTOR STRUCTURE FOR USE WITH OPTICAL DISKS

(75) Inventors: Yuzuru Suzuki, Shizuoka-ken (JP); Taketoshi Ohyashiki, Shizuoka-ken (JP); Taichi Nishio, Shizuoka-ken (JP)

(73) Assignee: Minebea Co., Ltd., Kitasaku-gun (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,499

(22) Filed: Jul. 1, 1998

(30) Foreign Application Priority Data

Jul. 8, 1997 (JP) ............................... 9-182336

(51) Int. Cl.[7] .............................. G11B 5/016; H02K 1/12
(52) U.S. Cl. ................................... 360/99.04; 310/254
(58) Field of Search .................... 360/99.04, 99.08; 369/266; 310/67 R, 216, 254, 256

(56) References Cited

U.S. PATENT DOCUMENTS

| 4,475,051 A | * | 10/1984 | Chai et al. ..................... 310/49 |
| 4,620,301 A | * | 10/1986 | Koide ......................... 369/266 |
| 5,296,981 A | * | 3/1994 | Ogawa ..................... 360/99.08 |
| 5,319,270 A | * | 6/1994 | Tanaka et al. ............. 310/67 R |
| 5,432,644 A | * | 7/1995 | Tajima et al. ............. 360/99.04 |
| 5,453,972 A | * | 9/1995 | Kanazawa et al. .......... 369/219 |
| 5,880,551 A | * | 3/1999 | Prudham ..................... 310/254 |
| 5,909,072 A | * | 6/1999 | Muller ........................ 310/173 |

FOREIGN PATENT DOCUMENTS

JP        60-261353        * 12/1985

* cited by examiner

Primary Examiner—David Davis
(74) Attorney, Agent, or Firm—Staas & Halsey LLP (57) ABSTRACT

An inner rotor type motor has a plurality of stator magnetic poles projecting inwardly from a stator yoke surrounding the outer periphery of a shaft, of which a plurality of stator magnetic poles, some, at least the same number as the number of the phases of the driving voltage, are each provided with a driving coil and a decelerating coil wound around the same and form long stator magnetic poles (26), while the remaining stator magnetic poles are each made shorter than the long stator magnetic poles, not provided with a winding, and form short stator magnetic poles. Further, the motor has a rotor rotating centering around the shaft and having rotor magnets made up of permanent magnets disposed in a confronting relationship with salient poles of the stator magnetic poles.

13 Claims, 8 Drawing Sheets

[PRIOR ART]

MOTOR STRUCTURE FOR USE WITH OPTICAL DISKS

BACKGROUND OF THE INVENTION

1. Field of the Invention

The invention relates to a motor improved in acceleration/deceleration performance and, more particularly, to a motor improved in acceleration/deceleration performance as a motor for use in peripheral equipment of computers such as a spindle motor for an optical disk.

2. Description of the Prior Art

Recently there have been made remarkable advances in technologies for attaining higher performance, especially higher speed operation, of various types of OA machines. Accordingly, there are demands for higher revolving speeds achieving higher speed operation of spindle motors for driving disks in various machines. In the case, particularly, of a spindle motor for the CD-ROM under the CLV (Constant Linear Velocity) control to keep the linear velocity constant, it is demanded of the motor to keep the accelerating/decelerating time within the limit of a required length of time, as well as to rotate at high speeds. These motors are generally the outer rotor type such that as large a torque as possible is obtained. However, such a system, although torque constant indicating the motor performance can be easily obtained therein, is not the best one, because in achieving higher speed operation accompanying a large number of revolutions, the torque constant must be kept low.

A problem involved in the achievement of higher speed operation is the characteristic of the accelerating/decelerating time. In the CD-ROM drive, since it drives a disk of a diameter of 12 cm, it must provide a large moment of inertia and, hence, it especially is difficult to keep the decelerating time within specified limits and this has been a big problem. Therefore, in the products of an octuple speed or higher multiple speed, the CAV (Constant Angular Velocity) control is used jointly with the CLV control to widen the range in which the number of revolutions is kept constant so that the variation in the number of revolutions is reduced. Consequently, it becomes necessary to change the read frequency between inner and outer circumferential portions and, hence, some control is required to be made on the side of the read device. Further, since the rated rotating speed represents the average speed or the maximum speed, it is becoming impossible to imply "constant linear velocity at any position" as with the case of lower multiple speed products. Further, by lowering the torque constant for achieving higher revolving speeds, the power consumption is much increased under the same load and, hence, the effect of heat on the optical head or the like produces problems and, also from the point of view of energy saving, it is required to improve the efficiency.

Figure 10:
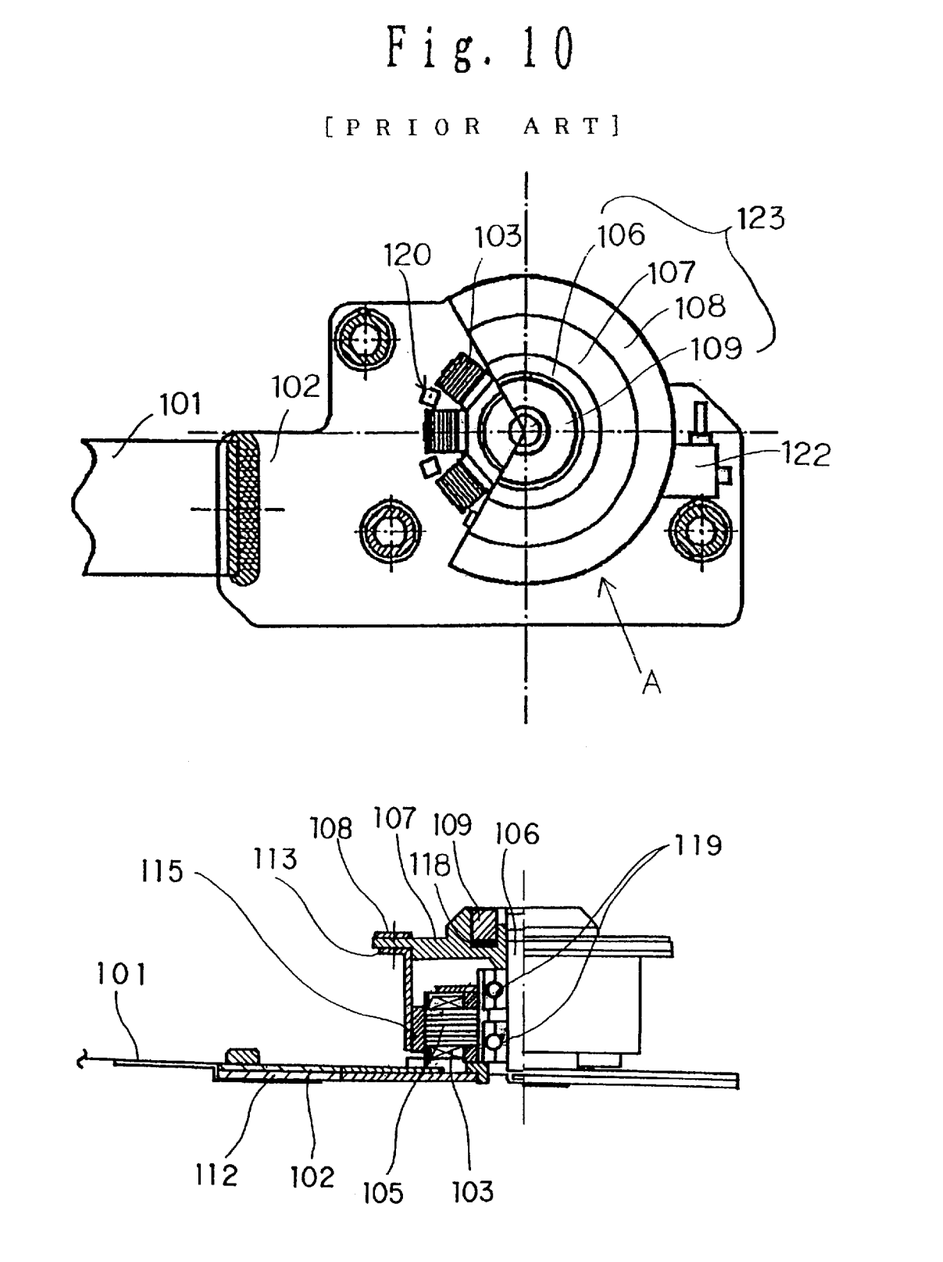
FIG. 10 shows a plan view of a prior art outer rotor type motor and a front view with a portion thereof broken away.

FIG. 10 is a structural drawing of an outer rotor type DC brushless motor of the prior art, in which reference numeral 101 denotes a lead wire formed of a flat cable serving as the interface of the motor. Reference numeral 102 denotes a circuit board on which the body of the motor is installed and control elements, wiring circuits, and the like are disposed. Reference numeral 103 denotes a driving coil. Reference numeral 105 denotes a stator yoke built up from laminations of soft magnetic sheet steel and it has salient poles provided on the outer circumference. Reference numeral 123 denotes a rotor. The rotor 123 includes a shaft 106, a turntable 107, a rubber 108, a magnet 109, back yokes 113 and 118, and a rotor magnet 115. Reference numeral 112 denotes a substrate for mounting parts and the like thereon, 119 denotes a bearing, 120 denotes a position detecting sensor, and 122 denotes a position detecting switch.

In the prior art outer rotor type DC brushless motor, while nine driving coils 103 are disposed centering around the shaft 106 and evenly distributed along the circumference of it, the driving coil 103 cannot be disposed beyond the position of the rotor magnet 115 because the rotor 123 is of the outer rotor type. Accordingly, it is impossible to obtain a sufficient coil space to place therein a decelerating coil for braking. Nevertheless, there is left a wasteful space on the side opposite to the optical head, i.e., on the substrate indicated by character A.

The invention was made in view of the above described problems. Accordingly, it is an object of the invention to provide a motor, or more particularly a high speed motor for driving optical disks such as CD-ROM, CD-R, and DVD-ROM, improved in the accelerating/decelerating characteristics and able to keep the current consumption as small as possible.

SUMMARY OF THE INVENTION

In order to achieve the above described object, the invention provides a motor structure of an inner rotor type comprising a rotor magnetic pole made of permanent magnets forming magnetic poles on the outer periphery and rotating centering around the shaft and a stator magnetic pole having salient poles with a driving coil wound around the same and disposed in confronting relationship with the rotor magnetic poles, the improvement comprising a plurality of stator magnetic poles projecting inwardly from the stator yoke surrounding the outer periphery of the shaft, of which plurality of stator magnetic poles, some, at least the same number as the number of the phases of the driving voltage, are each provided with a driving coil and a decelerating coil wound around the same and form stator magnectic poles having short salient poles, while the remaining stator magnetic poles are each made shorter than the long stator magnectic pole, provided with no winding, and form stator magnectic poles having short salient poles, and the rotor magnet being made up of permanent magnets disposed in confronting relationship with the salient poles of the stator magnetic poles for rotating centering around the shaft. Further, in configuring the motor in the invention, the inner rotor type was adopted to avoid its mechanical interference (contact) with the optical head fixed in place together with the motor and to obtain as large a coil space as possible, the driving coils and the decelerating coils are disposed on the side opposite to the position where the optical head is disposed, and the range within which they are disposed is set to 200 degrees or less. Hence, the shape of the stator is made smaller on the side toward the optical head and larger on the opposite side. Further, as a matter of course, there is provided some relief at the portion where it is required for installing the motor and, hence, the exterior view of the stator yoke assumes an odd shape having protrusions and depressions so that as large a space as possible is available for placing coils therein. While, as the main design, the decelerating coil for deceleration only is disposed on the inner circumferential side of the salient pole opposing the rotor magnet across a minute space, i.e., on the side toward the rotor magnet, and the driving coil is disposed on the outer side, the decelerating coil and the driving coil may be disposed at the same position or they may be placed at the same position but one in the inner layers and the other in the outer layers. Here, the decelerating coils are each provided for each phase and they are connected in a star or delta network and provided with their operating switches provided at the terminals of the coils. Further, the number of turns of the decelerating coil is made larger than that of the driving coil, so that the inconsistent requirements, i.e., to lower the torque constant (Kt) as the condition for high speed rotation of the motor and to increase the induced electromotive force as the condition for shortening the decelerating time, are met. Thereby, the decelerating coil becomes more effective in achieving the deceleration within a minimum amount of time. Further, on the circuit board, which also serves as the relays of the electric circuits of the coils, there are disposed transistors serving as the switches for the decelerating coils. Thus, by having the circuits for deceleration taken in the motor side, it was arranged such that the motor seen from the controlling side is virtually not different from the product of the prior art. Thereby, it has been made possible to obtain, from the motor size virtually not different from the prior art product, a larger number of revolutions and a shorter decelerating time at the same time. Further, as for the cogging as a problem with the inner rotor type, the salient poles of the short stator magnectic poles are evenly disposed on the plane opposing the salient poles of the long stator magnectic poles, as with the prior art inner rotor type, so that the magnetism in the rotor is balanced and the cogging is suppressed. Hence, while it is a motor of the inner rotor type, the cogging therein is kept at the same level as that in the outer rotor type of the prior art. Further, since the inner rotor type generally has smaller rotor diameter and smaller magnetic pole pitch, a sine waveform of the magnetization waveform can be kept up even if the number of poles is small and higher harmonic components adversely affecting the characteristics can be reduced. Therefore, the driving frequency can be set low without deteriorating the characteristics. By the decrease in the driving frequency, the eddy current loss caused by the alternating magnetic field could be reduced, the current consumption kept low, and the motor efficiency improved.

By means of the above described configuration, it becomes possible to provide a high efficiency motor capable of achieving at the same time both higher speed operation and reduction in accelerating/decelerating time.

DESCRIPTION OF THE PREFERRED EMBODIMENT(S)

Figure 1:
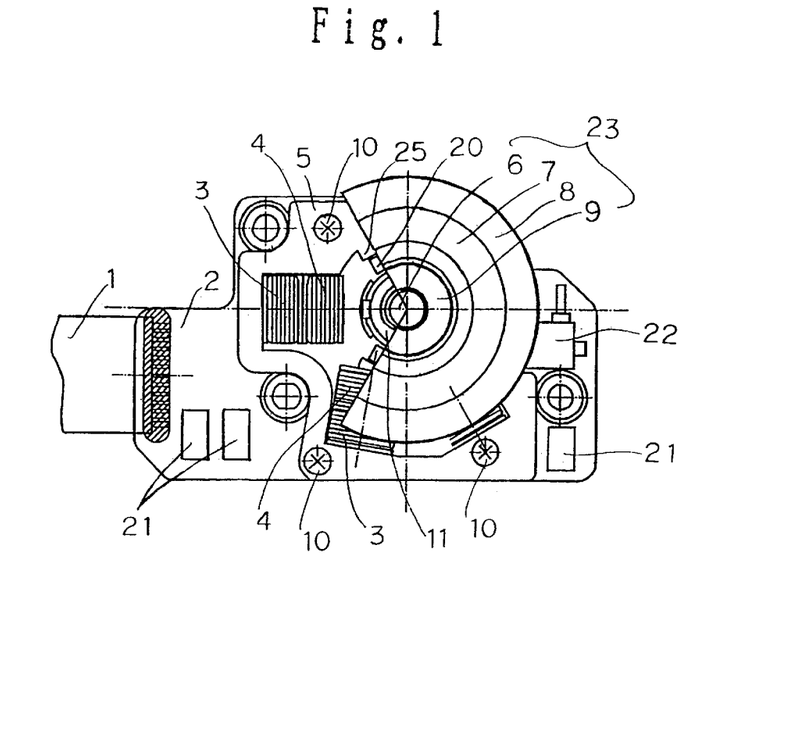
FIG. 1 is a plan view with a portion broken away of the motor according to the invention.
Figure 2:
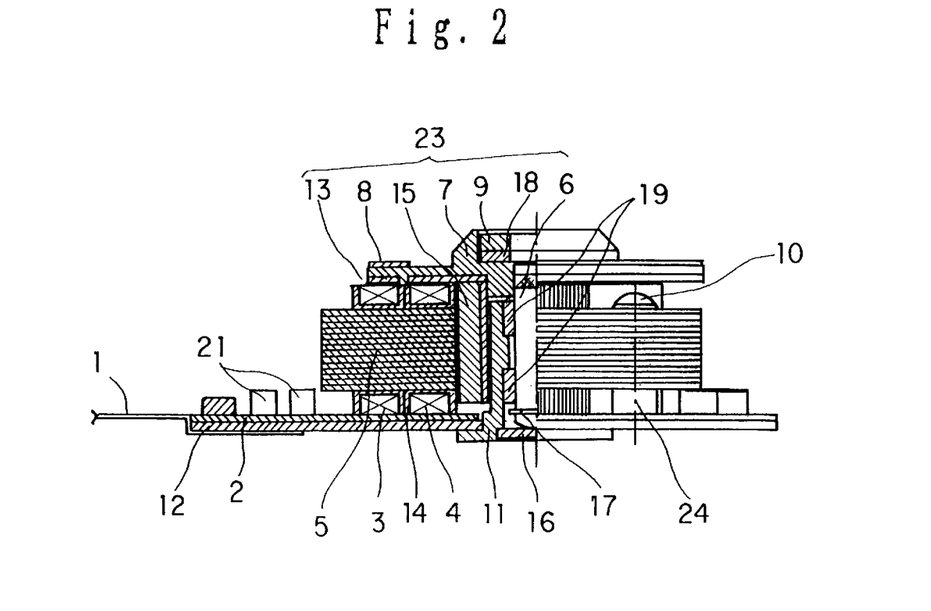
FIG. 2 is a sectional front view of the motor according to the invention.

An embodiment of the invention will be described in detail with reference to the accompanying drawings. FIG. 1 is a plan view of an inner rotor type brushless DC motor for CD-ROM according to the invention and FIG. 2 is a front view of the same. Referring to the drawing, reference numeral 1 denotes a lead wire formed of a flat cable serving as the interface of the motor. Reference numeral 2 denotes a circuit board on which the body of the motor is installed and control elements, wiring circuits, and the like are disposed. Reference numeral 3 denotes a driving coil formed by winding a magnet wire around a bobbin 14. Reference numeral 4 denotes a decelerating coil formed in the same manner as the driving coil 3. Reference numeral 5 denotes a stator yoke built up from laminations of soft magnetic sheet steel such that it has salient poles 25 on the inner circumference. Reference numeral 23 denotes a rotor. The rotor 23 includes a shaft 6, a turntable 7, a rubber 8, a magnet 9, back yokes 13 and 18, and a rotor magnet 15, of which detailed description will be given later.

Figure 3:
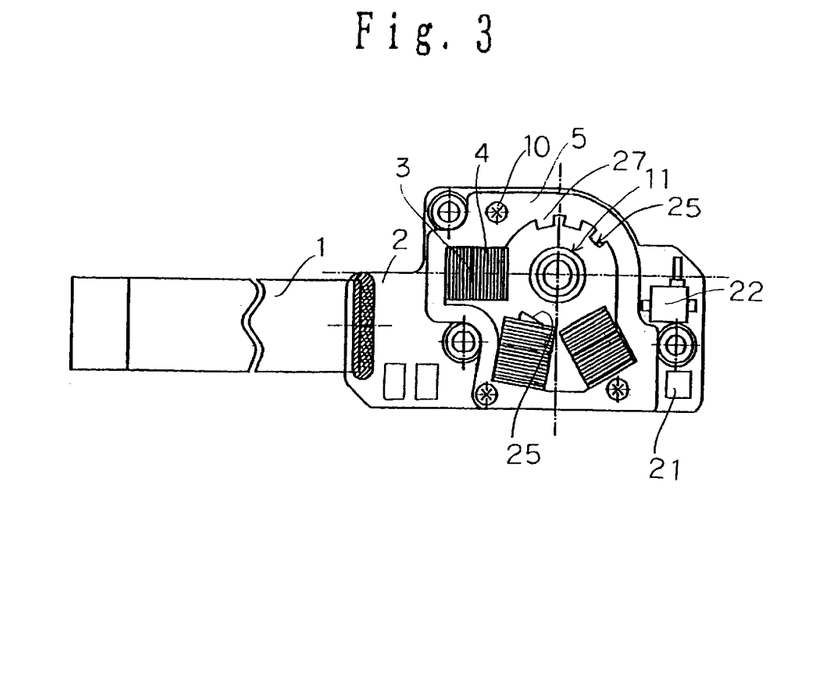
FIG. 3 is a plan view of the motor of the invention with its rotor taken away.
Figure 4:
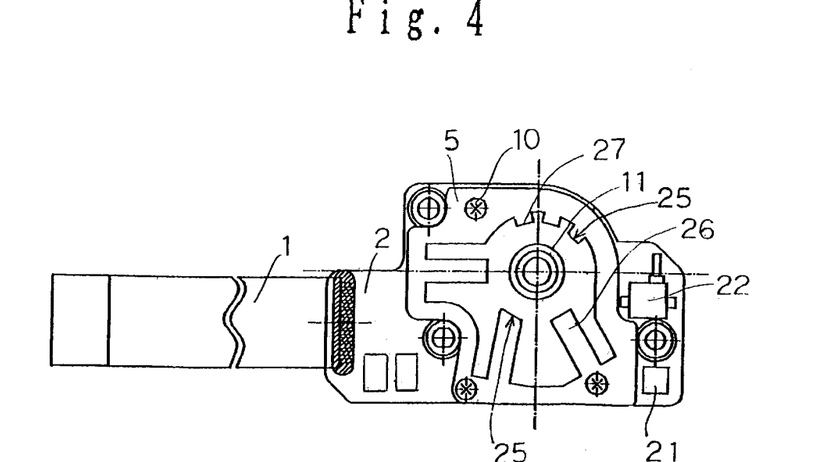
FIG. 4 is a plan view of the motor of the invention with its rotor and coils taken away.

FIG. 3 is a plan view showing the motor, shown in FIG. 1 and FIG. 2, with the rotor 23 taken away and FIG. 4 is a plan view of the above with the coils further taken away to show the shape of the stator. In further describing the structure of the motor with reference also to FIG. 3 and FIG. 4, the stator yoke 5 includes six salient poles 25 disposed on the inner circumference of the same. Short stator magnetic pole 27 with a short length has neither driving coil nor decelerating coil wound around the same. Each of three stator magnetic poles (long stator magnetic poles 26) longer than that described above is provided with the driving coil 3 of the motor wound around the bobbin 14, which is inserted from the interior of the stator yoke 5 and constitutes each phase (since this is the case of a three-phase motor, the three driving coils constitute U, V, and W phases). Then, the decelerating coil 4 formed in the same way as the driving coil 3 is inserted for each phase from the interior of the stator yoke 5 the same as the driving coil 3.

On the substrate 12 to which the stator yoke 5 is fixed, there are disposed the lead wire 1, the circuit board 2, with necessary electronic parts, such as operating switches 21 of an excitation switching position detecting sensor 20 and the decelerating coil 4 and an optical head position detecting switch 22, mounted thereon, a housing 11 for holding a bearing 19 which rotatably supports the rotor 23, and a pedestal 24 for receiving the stator.

After preparing the substrate 12 as described above, the ends of the coils placed in the stator yoke 5 are connected to the circuit board 2 by soldering or the like. Then, the stator yoke 5 is fitted in the pedestal 24, which is so formed that the inner peripheral surface of the stator yoke 5 and the bearing 19 may be aligned with each other and the relative position between the exciting position switching sensor 20 and the salient poles may be held correct and, then, the stator yoke 5 is fixed in place with set screws 10. Here, if the housing 11 and the pedestal 24 are formed of high polymer material (PBT, for example) and the bearing 19 and the substrate 12 are formed to be integral by insert mold, the perpendicularity of the bearing 19 to the substrate 12 can be kept accurate and, at the same time, cost reduction can be attained.

Now, the rotor 23 will be described. The rotor 23 has the turntable 7 on which an optical disk is placed and has the shaft 6 disposed in the center thereof. Here, the turntable 7 is made from a high polymer material (such as polycarbonate) and formed to be integrally with the shaft 6 by insert mold. On the back side of the turntable 7, there are provided protrusions at several points and the back yoke 13 of the rotor magnet 15, which also serves as reinforcement for the turntable, is fitted over the same and fixed by such a method as heat caulking in alignment with the shaft 6. To the back yoke 13, the rotor magnet 15 provided with predetermined magnetization is fixedly attached with an adhesive agent. On the obverse of the turntable, there is disposed the magnet 9, which is for attracting a clamper (not shown) for firmly holding the optical disk, adhesively fixed to a depressed portion in the center of the turntable 7 with the back yoke 18 on the back side thereof. On the outer circumferential side, there is provided the rubber attached thereto by gluing for preventing the optical disk from slipping off.

The rotor 23 structured as described above is fixed in place as a complete body with the shaft 6 fitted into the bearing 19 on the substrate 12 to which the stator yoke 5 is fixed, with a washer 17 for preventing the rotor 23 from slipping off placed, from the opposite side, over a groove made in the shaft 6, and finally with a thrust plate 16 fixedly inserted into the housing 11 after the height of the turntable 7 has been checked up.

Figure 5:
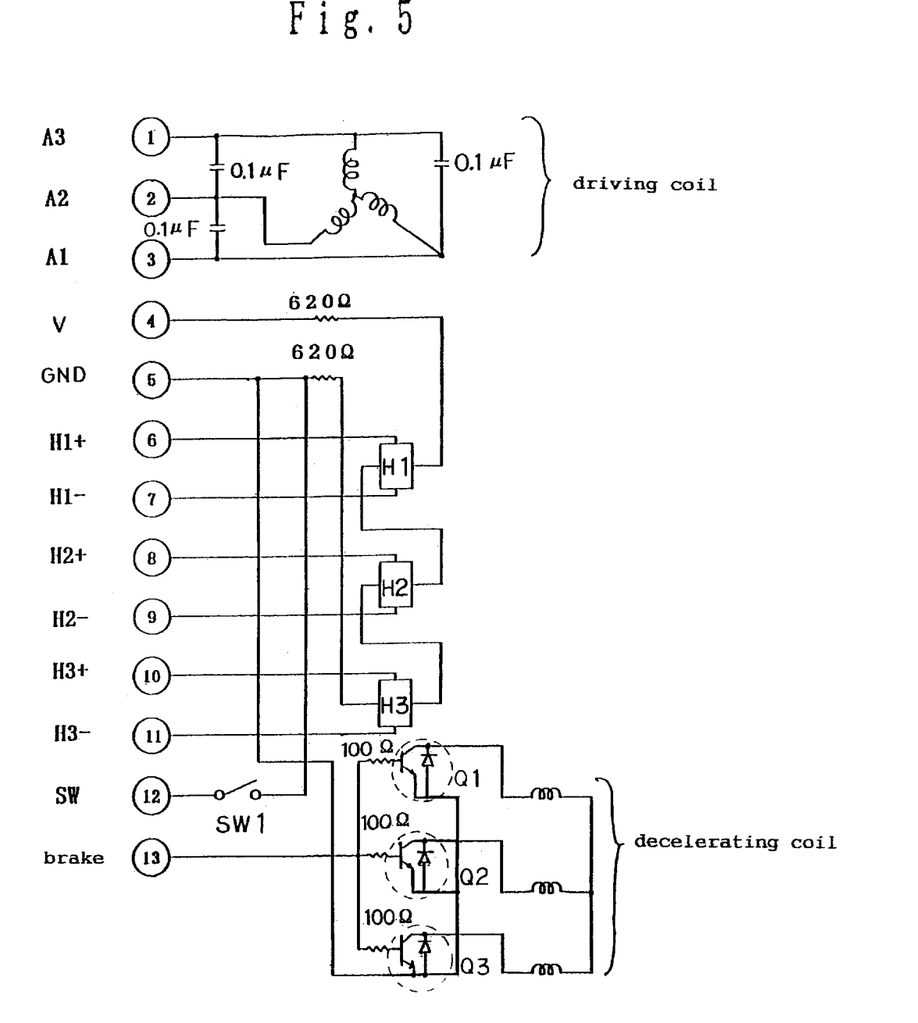
FIG. 5 is a diagram of circuit for driving the motor according to the invention.

Now, the functioning of the invention will be described. FIG. 5 is a diagram of the circuit for driving the motor of the invention. As apparent from FIG. 5, the decelerating coils 4, as well as the driving coils 3, are connected in a star network and the terminals of the same are connected to transistors Q1, Q2, and Q3, serving as their operating switches. The transistors are connected with a decelerating brake signal. Hence, when a decelerating signal is input to the brake terminal, the transistors (Q1, Q2, and Q3) as the operating switches of the decelerating coils are turned ON, whereby the terminals of the decelerating coils 4 are short-circuited together to provide a short brake and the rotation of the rotor 23 is decelerated. When the brake signal is removed, the transistors are turned OFF, whereby the decelerating coils 4 are brought to be independent from one another and the brake is released. Although the decelerating coils 4 were put in a star connection above, the same effect can be obtained if they are put in a delta connection and, further, other operating switches than transistors, such as relays and thyristors may also be used. Here, the number of turns of the decelerating coil 4 is made double that or more of the driving coil 3 to thereby make it possible to meet the inconsistent requirements, i.e., optimization of the torque constant (Kt) as the condition for achieving higher rotating speed of the motor (keeping the value low to a certain degree) and optimization of the induced electromotive force necessary for deceleration (bringing it to as large a value as possible).

Figure 6:
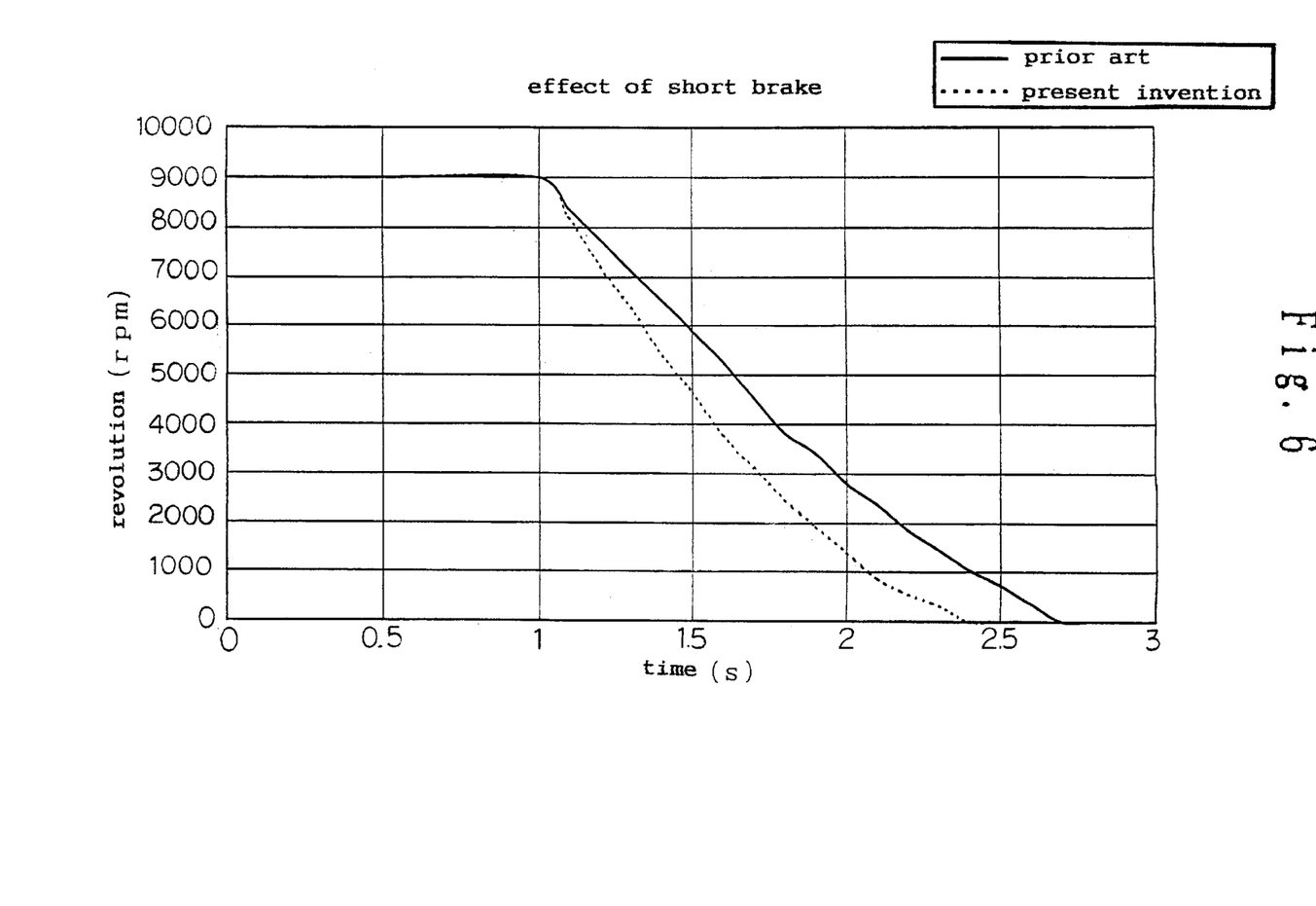
FIG. 6 is a characteristic drawing showing the braking effect of the invention.
Figure 7:
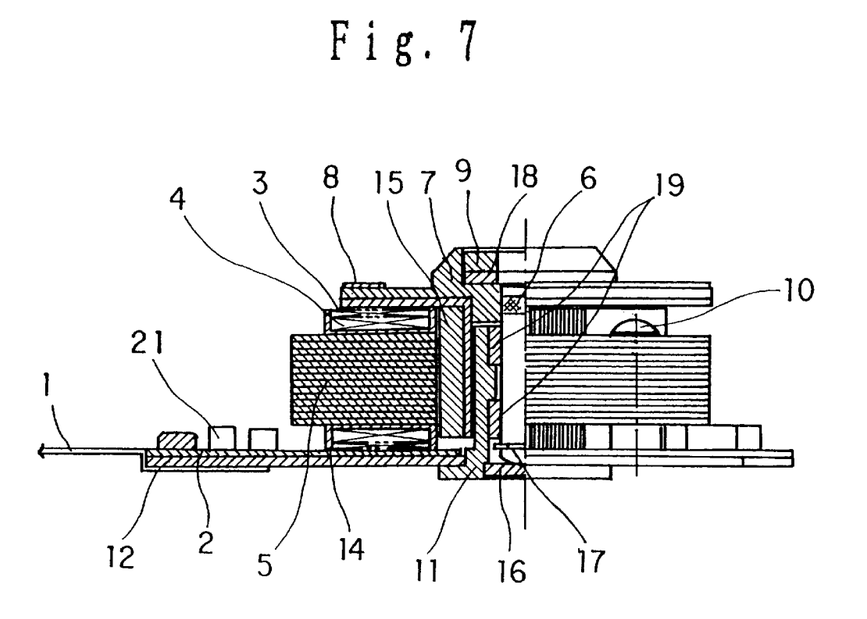
FIG. 7 is a sectional front view showing another embodiment.
Figure 8:
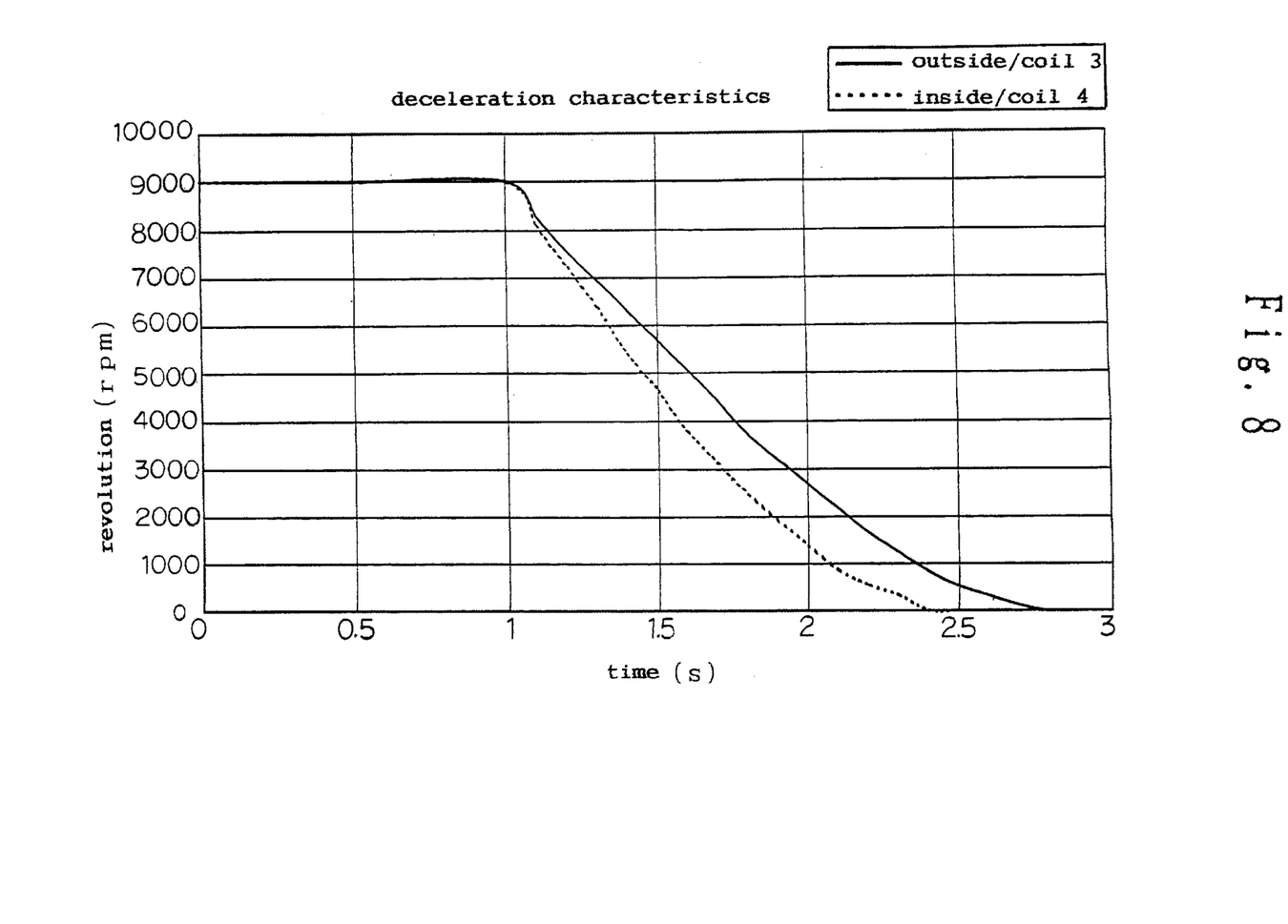
FIG. 8 is a characteristic drawing showing difference in decelerating characteristic depending on coil positions.

FIG. 6 shows deceleration characteristics depending on use and nonuse of the decelerating coil as an evaluation of the effectiveness of the decelerating coil 4. The purpose of arranging the decelerating coil 4 closer to the field magnet side than the driving coil 3 is for reducing the effect of the driving coil at the time of deceleration thereby enhancing the braking effect. The same effect can be obtained by winding the decelerating coil 4 in the inner layers of the layers of the driving coil 3 as shown in FIG. 7. Either of these arrangements may be suitably adopted according to the motor configuration. FIG. 8 shows difference in the deceleration characteristic according to the position of the decelerating coil 4 relative to the driving coil 3 as an evaluation to be referred to in determining the position of the decelerating coil.

As to the shape of the stator yoke 5, the size of it on the side of the optical head is preferred to be as small as possible, i.e., it cannot be made larger than the turntable 7, because of its relationship with the optical head. On the side opposite to the optical head, such a restriction is not so severe and, accordingly, the shape can be made larger than the turntable 7. Therefore, for the purpose of widening the coil space, the three salient poles on which the coils are mounted are made as long as possible. Because of the necessities for assembling the motor, it is arranged such that the exterior view of the stator yoke assumes an odd shape having protrusions and depressions. Further, the three short salient poles on the side toward the optical head are provided as countermeasures against cogging. By the provision of such salient poles, the amount of cogging can be lowered 10–20%, i.e., brought to a value similar to that of the prior art outer rotor type (5–8 g·cm).

Figure 9:
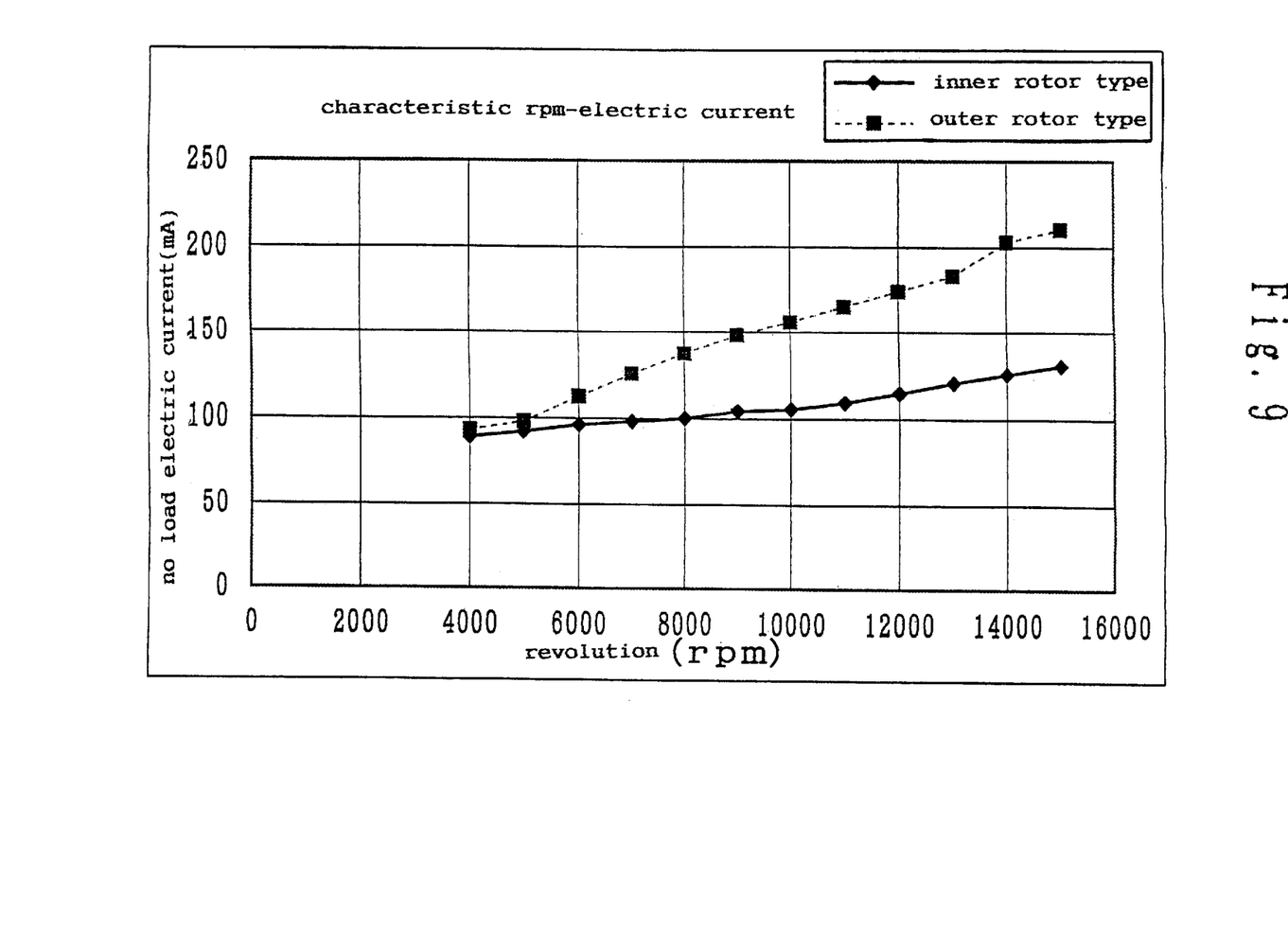
FIG. 9 is a characteristic drawing showing revolution-current characteristics of the motor according to the invention.

In the inner rotor type, since the rotor diameter is small, the magnetization waveform produces a sine waveform even if the number of poles is small and the higher harmonic components can be reduced so that the adverse effect due to the decrease in the number of poles is small. Hence, the increase in the eddy current loss due to increase in the driving frequency for achieving higher revolving speeds can be suppressed by the decrease in the number of poles. The pertinent results are shown in FIG. 9 as a comparison of a no-load current of the inner rotor type with that of the outer rotor type.

While the invention has been described above in its preferred embodiments, it is to be understood that various changes and applications are possible within the spirit of the invention and these changes and applications should not be excluded from the scope of the invention.

According to the invention, since a large space is obtained and decelerating coils are placed in the space, it is made possible to shorten the decelerating time which has been a problem involved in the multiplication of the motor speed. Further, since the number of the poles was decreased so as to be fitted for higher speed rotation, the current consumption has been decreased. Thus, a motor fitted for higher multiple speed rotation of which current consumption is low and the cogging level is at the same level as the prior art motor has been constructed without changing the size of the motor and at low cost.

What we claim is:

1. An inner rotor DC brushless motor structure having a shaft; a stator yoke surrounding an outer periphery of the shaft, a rotor magnet made of permanent magnets forming rotor magnetic poles on an outer periphery thereof and rotating centering around the shaft; a plurality of stator magnetic poles projecting inwardly from the stator yoke and a plurality of excitation switching position detecting sensors, the motor comprising:

a plurality of long stator magnetic poles formed on long salient poles and a plurality of short stator magnetic poles formed on short salient poles having a shorter length than the long salient poles, numbers of the long stator magnetic poles and the short stator magnetic poles being equal to each other, the number of the long stator magnetic poles being equal to or larger than the number of phases of driving voltage, a number of turns of the decelerating coil being at least a number of turns of the driving coil, and a driving coil and a decelerating coil being wound around each of the plurality of long stator magnetic poles while the plurality of short stator magnetic poles being provided with no winding, wherein the rotor magnet being made up of the permanent magnets is disposed in a confronting relationship with the stator magnetic poles rotating centering around the shaft, and a circuit to short circuit the decelerating coil by induction, to thereby decelerate the motor.

2. A motor structure according to the claim 1, wherein the decelerating coils are disposed in all phases of the motor structure and have respective terminals which have corresponding operating switches.

3. A motor structure according to the claim 2, wherein the operating switches are disposed on a circuit board on which a body of the motor structure is installed.

4. A motor structure according to claim 3, wherein the stator yoke is disposed in a manner so as to avoid parts on the circuit board.

5. A motor structure according to claim 4, wherein the stator yoke is not circularly shaped.

6. A motor structure according to claim 1, wherein the driving coils are disposed in a range of central angles of 200 degrees or less.

7. A motor structure according to claim 1, wherein each of the decelerating coils and a corresponding one of the driving coils are disposed at a same position.

8. A motor structure according to claim 1, wherein the decelerating coils are disposed closer to a rotor than corresponding ones of the driving coils.

9. A motor structure according to claim 1, wherein the decelerating coils are each disposed in inner layers of the stator magnetic poles and the driving coils are each disposed in outer layers of the stator magnetic poles.

10. A motor structure according to claim 1, wherein a number of turns of each decelerating coil is greater than that of a corresponding driving coil.

11. A motor structure according to claim 1, wherein the short stator magnetic poles are disposed in a shortest distance part between the shaft and an outside of the stator yoke.

12. A motor structure according to claim 1, wherein the motor structure is used for a spindle motor for an optical disk.

13. A motor structure according to claim 1, wherein the number of the plurality of stator magnetic poles is equal to the number of the phases of the driving voltage.

* * * * *

UNITED STATES PATENT AND TRADEMARK OFFICE
CERTIFICATE OF CORRECTION

PATENT NO. : 6,603,635 B1  Page 1 of 1
DATED : August 5, 2003
INVENTOR(S) : Yuzuru Suzuki et al.

It is certified that error appears in the above-identified patent and that said Letters Patent is hereby corrected as shown below:

Title page,
Item [56], References Cited, add the following after FOREIGN PATENT DOCUMENTS: -- OTHER PUBLICATIONS
    Japanese Reference 62-156035 filed July 1987 --

Column 2,
Line 37, change "short" to -- long --

Signed and Sealed this

Twentieth Day of January, 2004

JON W. DUDAS
*Acting Director of the United States Patent and Trademark Office*